United States Patent [19]

Shiotani et al.

[11] Patent Number: 5,093,788
[45] Date of Patent: * Mar. 3, 1992

[54] TRANSLATION MACHINE SYSTEM WITH SPLITTING AND COMBINING OF SENTENCES

[75] Inventors: Shinobu Shiotani; Syuzo Kugimiya; Yoji Fukumochi; Ichiko Sata; Shinji Tokunaga; Hitoshi Suzuki, all of Nara, Japan

[73] Assignee: Sharp Kabushiki Kaisha, Osaka, Japan

[*] Notice: The portion of the term of this patent subsequent to Mar. 21, 2006 has been disclaimed.

[21] Appl. No.: 66,247

[22] Filed: Jun. 25, 1987

[30] Foreign Application Priority Data

Jun. 30, 1986 [JP] Japan .............................. 61-155787

[51] Int. Cl.⁵ .............................................. G06F 15/38
[52] U.S. Cl. .............................................. 364/419
[58] Field of Search .............. 364/419, 200 MS File, 364/900 MS File

[56] References Cited

U.S. PATENT DOCUMENTS

| | | | |
|---|---|---|---|
| 4,460,973 | 7/1984 | Tanimoto et al. | 364/419 X |
| 4,814,987 | 3/1989 | Miyao et al. | 364/419 |
| 4,814,988 | 3/1989 | Shiotani et al. | 364/419 |
| 4,894,779 | 1/1990 | Suzuki et al. | 364/419 |

FOREIGN PATENT DOCUMENTS

| | | | |
|---|---|---|---|
| 0165179 | 9/1984 | Japan | 364/419 |
| 0195664 | 10/1985 | Japan | 364/419 |
| 0251468 | 12/1985 | Japan | 364/419 |
| 0254275 | 12/1985 | Japan | 364/419 |

OTHER PUBLICATIONS

Tucker, "A Perspective on Machine Translation: Theory and Practice", *Communications of the ACM*, vol. 27, No. 4, Apr. 1984, pp. 322-329.

*Primary Examiner*—Dale M. Shaw
*Assistant Examiner*—David Huntley

[57] ABSTRACT

A translation machine system capable of displaying the original input sentence and the sentence translated from the original sentence includes a device which optionally splits a sentence into multiple sentences, and a device which connects multiple sentences into a single sentence.

4 Claims, 3 Drawing Sheets

| ENGLISH SENTENCE | TRANSLATED JAPANESE SENTENCE |
|---|---|
| ◇ I am a boy and she is a girl. | 私は少年である。そして。彼女は女の子である。 |

FIG. 3(a)

| ENGLISH SENTENCE | TRANSLATED JAPANESE SENTENCE |
|---|---|
| ◇ I am a boy/and she is a girl. | 私は少年である。そして。彼女は女の子である。 |

FIG. 3(b)

| ENGLISH SENTENCE | TRANSLATED JAPANESE SENTENCE |
|---|---|
| ◇ I am a boy | 私は少年である。そして。彼女は女の子である。 |
| ◇ and she is a girl. | |

FIG. 3(c)

| ENGLISH SENTENCE | TRANSLATED JAPANESE SENTENCE |
|---|---|
| ◇ I am a boy. | 私は少年である。 |
| ◇ She is a girl. | 彼女は女の子である。 |

FIG. 4(a)

| ENGLISH SENTENCE | TRANSLATED JAPANESE SENTENCE |
|---|---|
| ◇ I am a boy. She is a girl. | 私は少年である。 彼女は女の子である。 |

FIG. 4(b)

TRANSLATION MACHINE SYSTEM WITH SPLITTING AND COMBINING OF SENTENCES

BACKGROUND OF THE INVENTION

Field of the Invention

The present invention relates to a translation machine system for displaying an original input sentence and the corresponding translated sentence (i.e., the result of the translation of this original sentence) on the CRT display and then proceeds with a communication-type translation process between the operator and the translation system. More particularly, the translation machine system provides a function for splitting a sentence into multiple sentences at a designated position and of connecting multiple sentences into one sentence.

Conventional translation machine systems translate the entire original input sentence. However, these systems are not provided with the function to translate only a desired portion of the original input sentence. Consequently, any of these prior systems has the disadvantages described below.

(1) A set amount of time is required to fully translate a lengthy original input sentence. Results are not generated until the machine has completed the entire translation.

(2) If there is any error, or any phrase that cannot easily be translated by the machine in part of the original input sentence, the machine cannot generate the translation of the entire original input sentence.

(3) If only part of the original input sentence is to be translated, the operator is obliged to input the required portion again as an independent translation.

SUMMARY OF THE INVENTION

The primary object of the invention is to overcome the problems mentioned above by providing a translation machine system which is easy to use and which allows the operator to optionally split an original input sentence into multiple sentences and to connect multiple sentences into one sentence so that the operator can use the machine with improved efficiency and convenience, thereby reducing the time required for the translation.

Briefly described, the invention provides a translation machine system capable of displaying the original input sentence and the translated sentence, which includes selectable functions for optionally splitting the sentence into multiple sentences, or for connecting multiple sentences into one sentence.

BRIEF DESCRIPTION OF THE DRAWINGS

The present invention will become more fully understood from the detailed description given hereinbelow and the accompanying drawings which are given by way of illustration only, and thus are not limitative of the invention and wherein:

FIGS. 3 (a) through (c) and 4 (a) and (b) are respectively charts showing examples of the original input sentence and the translated sentence under display.

DESCRIPTION OF THE INVENTION

Referring now more particularly to the accompanying drawings, a preferred embodiment of the translation machine system related to the invention is described below.

Figure 1:
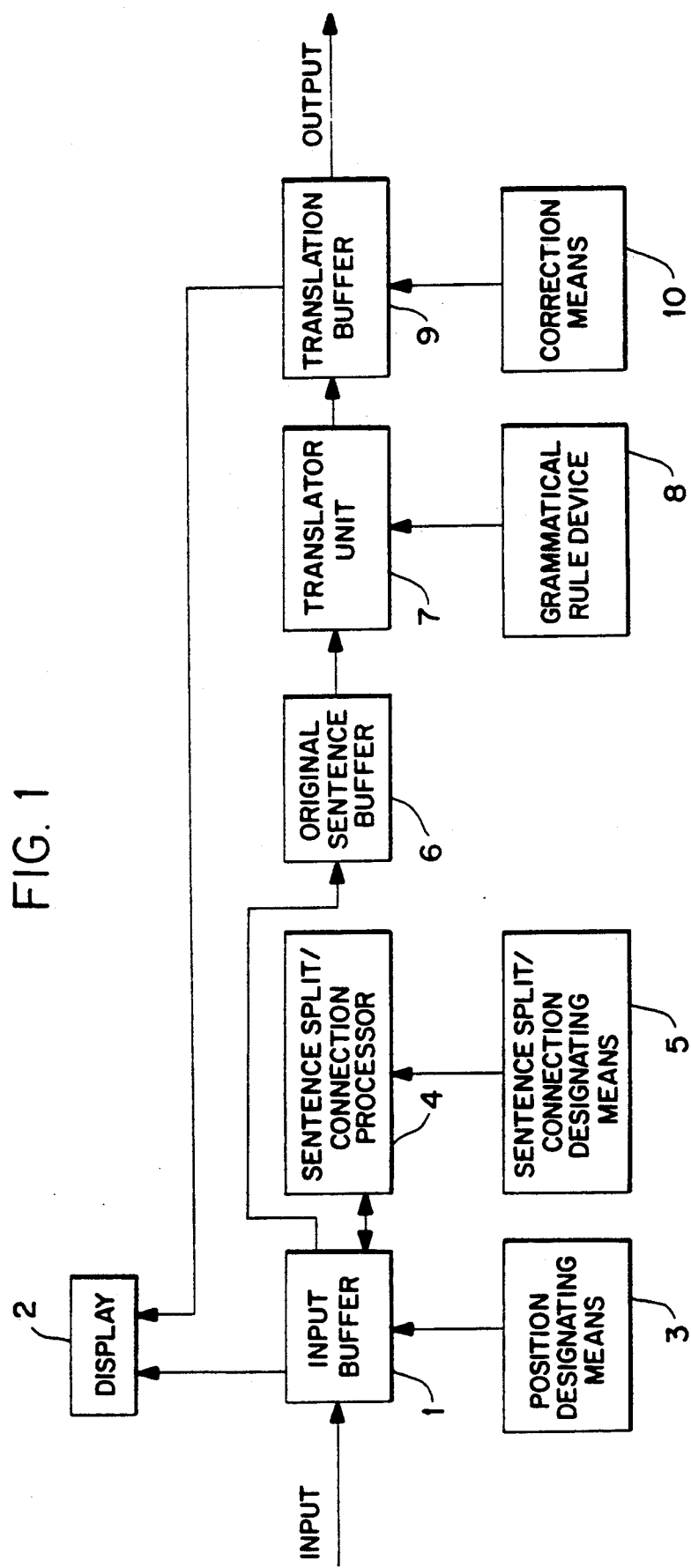
FIG. 1 is a simplified block diagram of the essential constituent elements of the translation machine system according related to the present invention.

FIG. 1 is a simplified block diagram of the essential constituent elements of the translation machine system according to the present invention. This system includes an input buffer 1 for storing the content of the original sentence inputted via an input device such as a keyboard or optical character reader (OCR), a CRT display unit 2 which displays the contents of the input buffer 1 and the translated sentence buffer 9 to be described below, a position designating means 3 for designating either the splitting position of the original input sentence delivered to the input buffer 1 and displayed on the CRT display screen 2 or the position for combining multiple sentences with each other. The preferred embodiment of the translation machine system according to the present invention introduces a ⌸ key for dividing the sentence into divisions and uses the cursor keys for connecting multiple sentences so that these cursor keys integrally function as the position designating means. The translation machine system according to the present invention further includes a sentence split/connection processor 4 for scanning the original input sentence stored in input buffer 1 and then detecting a designated position in the input sentence specified by the position designating means 3. The sentence split/connection processor 4 then either splits or connects the original input sentence stored in the input buffer 1 in response to a command from a sentence split/connection designating means 5. An original sentence buffer 6 stores the complete sentence if the original input sentence is designated to be either split or connected. The original sentence buffer 6 stores the original input sentence as it is if neither splitting nor connecting process is designated. A translator unit 7 includes a dictionary lookup device, morpheme analyzer, syntax analyzer, language converter, and language generator, and translates the contents of the original sentence buffer 6. A grammatical rule device 8 is activated only when the translator unit 7 executes the translation process. A translation buffer 9 stores the results of the translation as executed by the system. A correction means 10 allows the operator to correct or to modify the results of the translation displayed on the CRT display screen 2.

Figure 2:
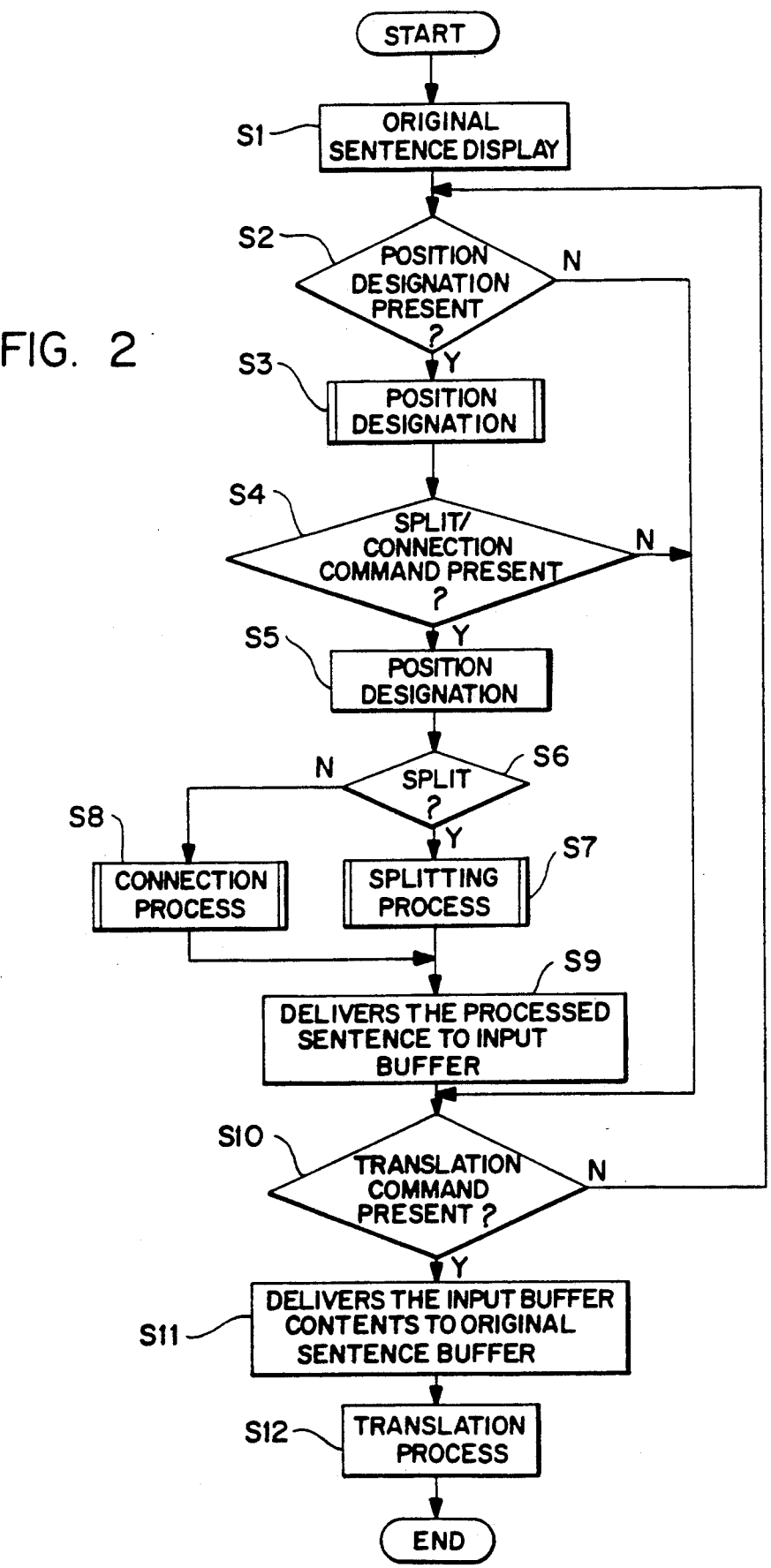
FIG. 2 is an operation flowchart of the translation machine system related to the invention.

Referring now to FIG. 2 denoting the operation flowchart, operations of the translation machine system related to the invention are described below.

On entry of the original sentence via a key input device, the sentence is stored in the input buffer 1, and simultaneously, the input sentence is displayed on the CRT display screen 2 as shown in FIGS. 3(a) and 4(a) while the operation mode remains in step S1.

Next, while observing the display, the operator designates the desired position in the original input sentence or the desired sentence by operating either a ⌸ key or cursor key as shown in FIGS. 3(b) and 4(a) during steps S2 and S3. When the operator presses the function key a command signal is generated for either splitting or connecting the input sentence during step S4. Thereafter, the sentence split/connection processor 4 reads the contents of the input buffer 1 and then detects whether there is a designated position in the input sentence during step S5. At step S6, the sentence split/connection processor 4 identifies whether the input sentence should be split or connected. If the splitting process should be executed, the processor 4 first detects the mark used for designating the position and then the processor 4 splits the original input sentence into two parts as defined by the function key during step S7. Alternatively, if the connection process should be executed, the processor 4 also detects the mark used for designating the desired connection position before connecting multiple marked sentences into a sentence during step S8. The processed sentence is then stored in the input buffer 1 during step S9. See FIGS. 3(c) and 4(b). Then, upon receipt of the translation startup command, the system executes the translation process during steps S10 through S11.

As is clear from the above description, the preferred embodiment of the translation machine system related to the present invention either splits the original input sentence at a designated position or connects multiple sentences into one sentence as required. As a result, the translation machine system related to the invention is extremely useful for translating a very lengthy original sentence in decreasing the conversion time required for translation and also increasing the efficiency of the translation process.

In the event that no position designation is designated, the original input sentence is directly transferred to the original sentence buffer 6. When this is done, the operation mode proceeds from step S2 to steps S10 and S11. The results of the translation is delivered to the translation buffer 9, and simultaneously, it is also displayed on the CRT display screen 2. When implementing the above preferred embodiment, the splitting position of a sentence is indicated using the mark ⌸ and the designation of the parts of sentences to be connected is indicated by applying a cursor mark. It should be understood, however, that other marks can also be used.

As is clear from the above description, the translation machine system according to the present invention provides a variety of advantages by designating the desired position in the original input sentence for splitting the input sentence into multiple sentences or conversely for connecting multiple sentences to make up a single sentence.

(1) Since the translation machine system according to the present invention translates the contents of a lengthy original input sentence by splitting it into multiple sentences, when translating any sentence having complex syntax, the translation system allows the operator to optionally split any lengthy sentence into several parts (sentences) and convert them into simple expressions, or delete sentences incorrectly inputted as the original sentence. Thus, the system allows the operator to perform the translation in the shortest time possible.

(2) The disclosed translation system allows regrouping of multiple sentences into one sentence, and thus, the system is convenient for changing the expression of the original sentence, and rearranging the translated sentence, effectively by applying the splitting function.

While only certain embodiments of the invention have been described, it will be apparent to those skilled in the art that various changes and modifications may be made therein without departing from the spirit and scope of the present invention as claimed.

What is claimed is:

1. An electronic translation machine system for translating multiple sentences from a source language to a target language comprising:
   input means for inputting a plurality of source sentences;
   first buffer means in communication with said input means for storing said source sentences;
   position designation means coupled with said first buffer means for designating a division point separating a selected source sentence into parts and for inserting a position designation symbol in said selected source sentence;
   splitting means in communication with said first buffer means for scanning said selected source sentence for said position designation symbol and, once encountered, for splitting said selected source sentence into parts and for storing said parts in said first buffer means; and
   translation means for translating the parts of said selected source sentence stored in said buffer means from said source language to said target language.

2. An electronic translation machine system as recited in claim 1, further comprising:
   connection means in communication with said buffer means for connecting a plurality of said source sentences into a single sentence.

3. An electronic translation machine system as recited in claim 1, further comprising:
   display means for displaying said selected source sentence stored in said first buffer means.

4. An electronic translation machines as recited in claim 1, wherein said input means is a keyboard.

* * * * *